Figure 1:
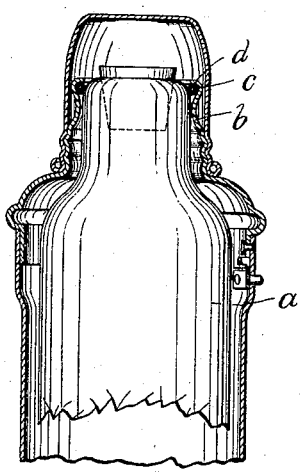
Figure 2:
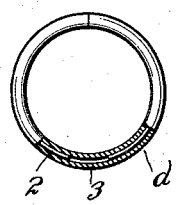
Figure 3:
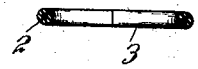

atively movable in response to the difference in magnetic strength of the said two solenoids and a movable indicating member actuated by the movable element of the said two relatively movable elements for indicating the movement of the same.

4. A speedometer comprising a permanent magnet, a pair of solenoids of different magnetic strength mounted to move in response to the difference in their magnetic strength with relation to the said magnet, means for indicating the movement of the said solenoids and means for supplying electric current to the latter.

5. A speedometer comprising a permanent magnet, a pair of solenoids of different magnetic strength mounted to move in response to the difference in their magnetic strength with relation to the said magnet, a scale disk, means for operating the same by the said solenoids and means for supplying current to the latter.

6. A speedometer comprising a fixed permanent magnet, a pair of solenoids movably mounted with respect to said magnet, means for supplying a constant current to the one solenoid, means for supplying an intermittent current to the other solenoid to increase the strength thereof with respect to the first named solenoid, means for indicating the movement of said solenoids and means for limiting their movement.

7. A speedometer comprising a fixed permanent magnet of circular form open at the pole, a pair of solenoids of different magnetic strength, a lever pivoted centrally of the said magnet and supporting the said two solenoids, an indicating member, means for operating the same from the said lever, and means for supplying current to the said solenoids to cause the same to move with relation to the said magnet and in response to their different magnetic strength.

Signed at New York, N. Y., this 26th day of June, 1914.

ALLEN A. CANTON.

Witnesses:
WALTER S. MARTIN,
IVAN KONIGSBERG.

F. E. CARLSON.
VACUUM BOTTLE.
APPLICATION FILED FEB. 19, 1914.

1,219,246.

Patented Mar. 13, 1917.

WITNESSES:

INVENTOR.
Frederick E. Carlson:
BY
ATTORNEY.